(12) United States Patent
Chen et al.

(10) Patent No.: US 11,989,566 B2
(45) Date of Patent: May 21, 2024

(54) METHOD FOR CONTROLLING ELECTRONIC DEVICE

(71) Applicant: SigmaStar Technology Ltd., Fujian (CN)

(72) Inventors: Lijin Chen, Xiamen (CN); Suzhen Liu, Xiamen (CN); Ye Chen, Xiamen (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 63 days.

(21) Appl. No.: 17/828,186

(22) Filed: May 31, 2022

(65) Prior Publication Data

US 2023/0168903 A1 Jun. 1, 2023

(30) Foreign Application Priority Data

Nov. 30, 2021 (CN) .......................... 202111439189.0

(51) Int. Cl.
*G06F 9/00* (2006.01)
*G06F 9/4401* (2018.01)
*G06F 15/177* (2006.01)

(52) U.S. Cl.
CPC .......... *G06F 9/4416* (2013.01); *G06F 9/4406* (2013.01); *G06F 9/4411* (2013.01)

(58) Field of Classification Search
CPC ..... G06F 9/4416; G06F 9/4411; G06F 9/4406
See application file for complete search history.

(56) References Cited

U.S. PATENT DOCUMENTS

| | | | |
|---|---|---|---|
| 10,372,463 B1* | 8/2019 | Twomey | G06F 9/4406 |
| 2013/0023280 A1* | 1/2013 | Paddon | H04W 4/20 |
| | | | 455/456.1 |
| 2014/0282481 A1* | 9/2014 | Ohara | G06F 8/654 |
| | | | 717/172 |
| 2015/0026448 A1* | 1/2015 | Jiang | G06F 9/4416 |
| | | | 713/2 |
| 2015/0256469 A1* | 9/2015 | Iwakura | H04L 47/32 |
| | | | 370/230 |
| 2016/0300064 A1* | 10/2016 | Stewart | G06F 12/0638 |
| 2018/0144135 A1* | 5/2018 | Rihan | H04L 63/1458 |
| 2019/0108007 A1* | 4/2019 | Hia | H04L 67/125 |

* cited by examiner

*Primary Examiner* — Mohammed H Rehman
(74) *Attorney, Agent, or Firm* — Edell, Shapiro & Finnan, LLC

(57) ABSTRACT

The disclosure provides a method for controlling an electronic device. The electronic device includes a processor, a read-only memory (ROM), a random access memory (RAM), an image sensor control (ISC) circuit, an image signal processor (ISP) and a communication interface circuit. The method includes: in response to the electronic device being powered up, executing a first program code in the ROM by the processor to initialize the communication interface circuit; transmitting identification information to an external device through the communication interface circuit; receiving, through the communication interface circuit, a second program code that the external device sends in response to the identification information so as to store the second program code to the RAM; and executing the second program code by the processor to initialize the ISC circuit and the ISP.

6 Claims, 7 Drawing Sheets

METHOD FOR CONTROLLING ELECTRONIC DEVICE

This application claims the benefit of China application Serial No. CN202111439189.0, filed on Nov. 30, 2021, the subject matter of which is incorporated herein by reference.

BACKGROUND OF THE INVENTION

Field of the Invention

The disclosure relates to device control, and more particularly to a method for controlling an electronic device.

Description of the Related Art

According to the prior art, an electronic device may have various functions. However, certain issues may occur. For example, the electronic device may need a quite large storage space to store firmware codes, and this may waste hardware resources of the electronic device to a great extent. In the prior art, some suggestions have been proposed in attempt to solve the issue above, with however certain potential additional side-effects incurred. Therefore, there is a need for a novel method and associated architecture, so as to implement a compact and reliable electronic device without bringing side-effects or less likely incurring side-effects.

SUMMARY OF THE INVENTION

It is an object of the disclosure to provide a method for controlling an electronic device so as to solve the issues above.

According to an embodiment of the disclosure, a method for controlling an electronic device is provided. The electronic device includes a processor, a read-only memory (ROM), a random access memory (RAM), an image sensor control (ISC) circuit, an image signal processor (ISP) and a communication interface circuit. The method includes: in response to the electronic device being powered up, executing a first program code in the ROM by the processor to initialize the communication interface circuit; transmitting identification information to an external device through the communication interface circuit; receiving, through the communication interface circuit, a second program code that the external device sends in response to the identification information so as to store the second program code to the RAM; and executing the second program code by the processor to initialize the ISC circuit and the ISP.

According to an embodiment of the disclosure, a method for controlling an electronic device is provided. The electronic device includes a first processor and a communication interface circuit. Another electronic device includes a second processor, a random access memory (RAM), an image sensor control (ISC) circuit, and an image signal processor (ISP). The method includes: receiving identification information from the another electronic device through the communication interface circuit; in response to the identification information, sending at least one program code to the another electronic device through the communication interface circuit so as to store the at least one program code to the RAM, and prompting the second processor to execute the at least one program code to initialize the ISC circuit and the ISP.

One benefit of the disclosure is that, by a carefully designed controlling mechanism, the method of the disclosure is capable of properly managing storage of program codes so as to save a storage space and ensure normal operations of an electronic device. Compared to the prior art, the method of the disclosure is capable of implementing a compact, fast and reliable electronic device without bringing side-effects or less likely incurring side-effects.

DETAILED DESCRIPTION OF THE INVENTION

Figure 1:
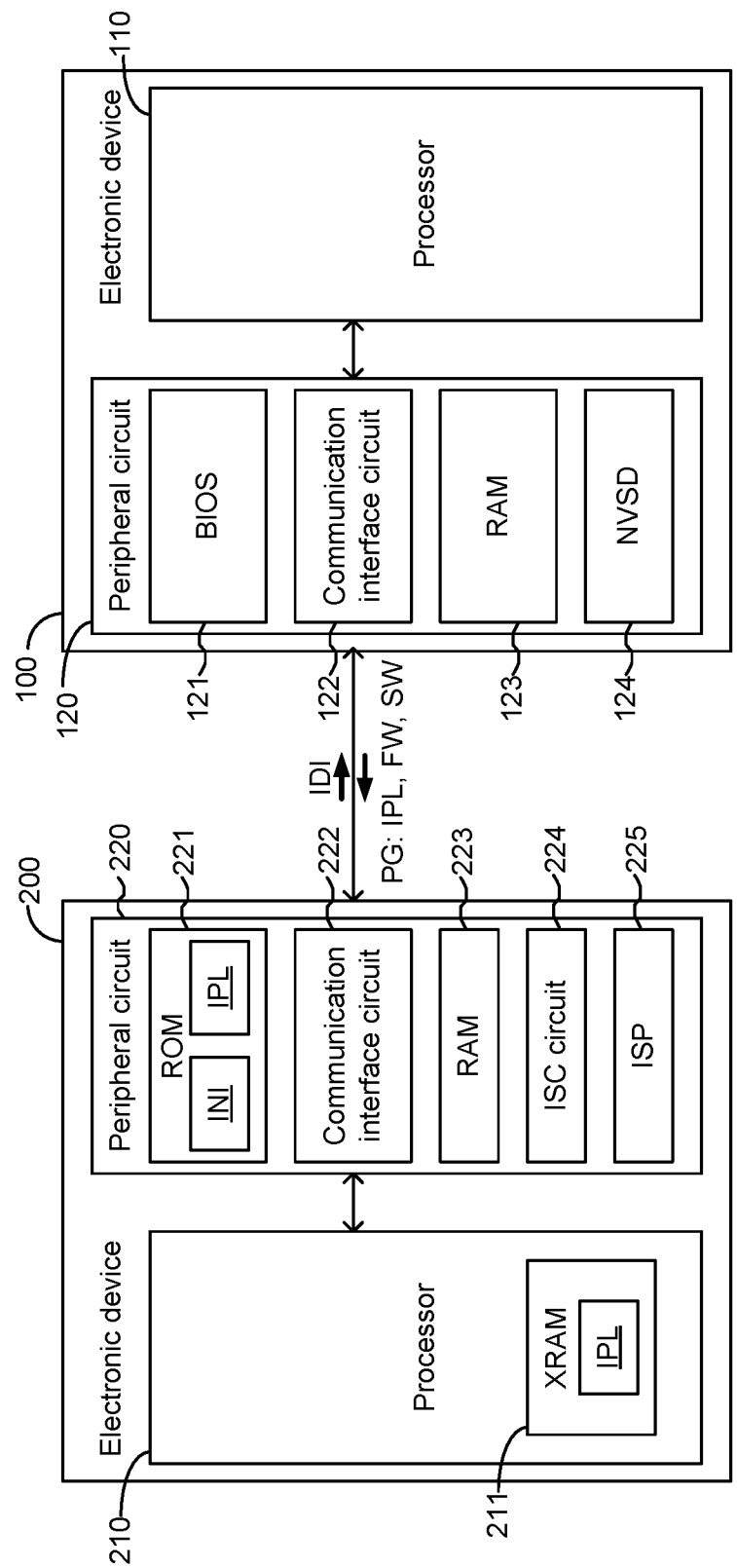
FIG. 1 is a schematic diagram of an electronic system according to an embodiment of the disclosure.

FIG. 1 shows a schematic diagram of an electronic system according to an embodiment of the disclosure. The electronic system may include electronic devices 100 and 200. The electronic device 100 may include a processor 110 and a peripheral circuit 120. The peripheral circuit 120 may include a basic input/output system (BIOS) 121, a communication interface circuit 122 and a random access memory (RAM) 132. The electronic device 200 may include a processor 210 and a peripheral circuit 220. The peripheral circuit 220 may include a read-only memory (ROM) 221, a communication interface circuit 222, a RAM 223, an image sensor control (ISC) circuit 224 and an image signal processor (ISP) 225. It should be noted that the disclosure is not limited to the examples above. In some embodiments, the electronic device 100 may further include a display module (not shown in FIG. 1) to display images, and the electronic device 200 may further include an image input module (not shown in FIG. 1) for inputting images, wherein the image input module may include a lens and an image sensor.

In the electronic device 100, the processor 110 may be used to control operations of the electronic device 100, the BIOS 121 may be used to perform basic input/output control, the communication interface circuit 122 may be used to communication with an external device (for example, the electronic device 200) for the electronic device 100, and the RAM 123 may be used to temporarily store information for the electronic device 100. In the electronic device 200, the processor 210 may be used to control operations of the electronic device 200, the ROM 221 may be used to store at least one program code (for example, one or more program codes) such as a program code INI, the communication interface circuit 222 may be used to communication with an external device (for example, the electronic device 100) for the electronic device 200, the RAM 223 may be used to temporarily store information for the electronic device 200, the ISC circuit 224 may be used to perform image sensing controlling and more particularly to control an image sensor to perform image sensing so as to generate at least one image signal, and the ISP 225 may be used to perform image signal processing and more particularly to process the at least one image signal so as to generate processed image data of the sensed image. The electronic device 200 may send the processed image data to the electronic device 100 for further use. It should be noted that the disclosure is not limited to the examples above. For example, the electronic device 100 may provide a video communication service to a user, and more particularly, providing processed image data of the sensed data above (for example, a face image of the user) obtained by the electronic device 200 so as to allow one or more other individuals in communication with the user through the video communication service to see the user, and displaying an image of the one or more other individuals by the display module (for example, a display panel such as an LCD panel) to allow the user to see the one or more other individuals.

As shown in FIG. 1, the electronic device 200 can send its identification information IDI to the electronic device 100 to enable the electronic device 100 to identify the electronic device 200, so as to determine whether to transmit a program code PG from the electronic device 100 to the electronic device 200. For example, the electronic device 100 may include a non-volatile storage device (NVSD) 124 for storing the program code PG corresponding to the electronic device 200 in advance. Moreover, the electronic device 100 may determine according to the identification information IDI whether the electronic device 200 belongs to a group of predetermined electronic devices, which may include one or more predetermined electronic devices. When the identification information IDI indicates that the electronic device 200 belongs to the group of predetermined electronic devices, the electronic device 100 may send the program code PG corresponding to the electronic device 200 to the electronic device 200 for the processor 210 to execute.

On the basis of the architecture shown in FIG. 1, hardware resources of the storage space of the electronic device 200 can be saved, and more particularly, the storage space of the ROM 221 in the electronic device 200 can be designed to be very small so that related costs of the ROM 221 can be correspondingly reduced. For example, the ROM 221 may store only the program code INI, and the processor 210 may execute the program code INI to initialize the communication interface circuit 222, so as to further obtain the program code PG through the communication interface circuit 222; however, the disclosure is not limited to the example above. Further, the program code PG may include at least one firmware code (for example, one or more firmware codes), such as a firmware code for initializing certain elements, and may include at least one software code (for example, one or more software codes), such as an operating system, at least one driver or at least one application. Thus, the electronic device 200 is not required to be provided with any non-volatile storage elements for storing the at least one firmware code and the at least one software code in advance. Thus, related costs can be correspondingly reduced.

In the embodiments above, the electronic device 100 may be implemented by means of a digital television, and the electronic device 200 may be implemented by means of a camera. Moreover, the communication interface circuits 122 and 222 may be implemented by means of Universal Serial Bus (USB) circuits.

In one embodiment, in the program code PG shown in FIG. 1, the at least one firmware code (for example, the one or more firmware codes) may be collectively referred to as a firmware code FW, and the at least one software code (for example, the one or more software codes) may be collectively referred to as a software code SW. Further, the ROM 221 may include the program code INI and an additional program code (for example, a third program code or another program code) such as a program code IPL for initializing the RAM 223.

In another embodiment, the program code PG may include the additional program code (for example, the third program code or the another program code) such as the program code IPL for initializing the RAM 223. The processor 210 may include a built-in memory such as an Expanded Random Access Memory (XRAM) 211. The processor 210 can load the program code IPL to the XRAM 211 so as to execute the program code IPL.

Figure 2:
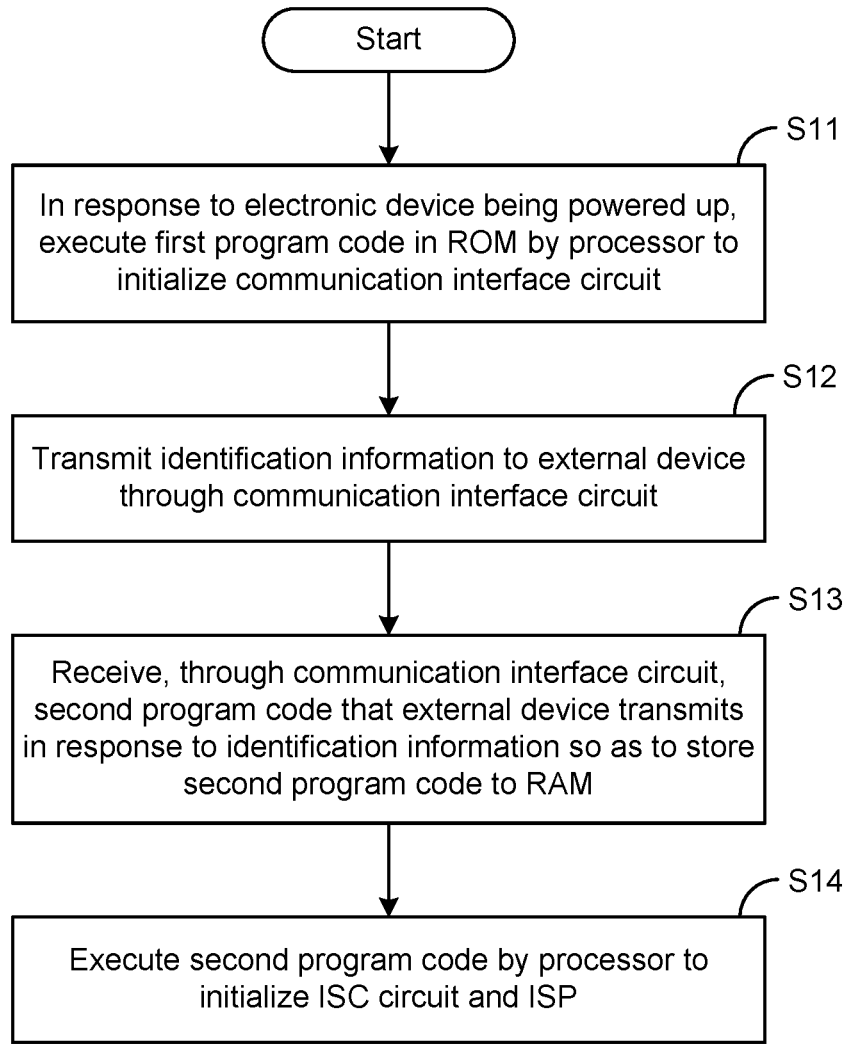
FIG. 2 is a flowchart of a method for controlling an electronic device according to an embodiment of the disclosure, wherein the method is applied to the electronic system shown in FIG. 1.

FIG. 2 shows a flowchart of a method for controlling an electronic device according to an embodiment of the disclosure, wherein the method is applicable to the electronic system shown in FIG. 1, and more particularly to the electronic device 200.

In step S11, in response to the electronic device 200 being powered up, the processor 210 can execute a first program code (for example, the program code INI) in the ROM 221 to initialize the communication interface circuit 222.

In step S12, the processor 210 can send the identification information IDI to an external device (for example, the electronic device 100) through the communication interface circuit 222.

In step S13, the processor 210 can receive through the communication interface circuit 222 a second program code (for example, the program code PG) that the external device (for example, the electronic device 100) sends in response to the identification information IDI, and store the second program code to the RAM 223.

In step S14, the processor 210 can execute the second program code (for example, the program code PG) to initialize the ISC circuit 224 and the ISP 225.

For better understanding, the second program code (for example, the program code PG) may include a firmware code and a software code. For example, the firmware code may be used to initialize the ISC circuit 224 and the ISP 225, and the software code may be used to activate the operating system.

The operation process shown in FIG. 2 is described to provide better understanding; however, the disclosure is not limited to the example above. According to some embodiments, one or more steps may be added to the operation process in FIG. 2. For example, the one or more steps may include: (1) before receiving the second program code, the processor 210 receiving through the communication interface circuit 222 a third program code that the external device (for example, the electronic device 100) sends and storing the third program code to a memory in the processor 210; and (2) the processor 210 executing the third program code to initialize the RAM 223; however, the disclosure is not limited to the examples above. According to some embodiments, the third program code may be stored in the ROM 221 in advance, instead of being sent from the electronic device 100 to the electronic device 200 through the communication interface circuits 122 and 222, and the processor 210 can execute the third program code in the ROM 221 to initialize the RAM 223.

According to some embodiments, the processor 210 can execute the first program code (for example, the program code INI) to detect a hardware state, and accordingly determine whether to transmit the identification information IDI to the external device (for example, the electronic device 100). For example, the detecting of a hardware state may be detecting a connection state of a bootstrap circuit pin. If the connection state of the bootstrap circuit pin indicates that the identification information IDI should be transmitted to the external device, the processor 210 transmits the identification information IDI to the external device (for example, the electronic device 100) through the communication interface circuit 222, or else does not transmit the identification information IDI to the external device. A manufacturer of the electronic system (for example, the electronic device 200) may configure the connection state of the bootstrap circuit pin in advance, and more particularly, controlling the connection state of the bootstrap circuit pin to be whether equal to a first predetermined connection state, so as to indicate whether the identification information IDI should be transmitted to the external device.

Figure 3:
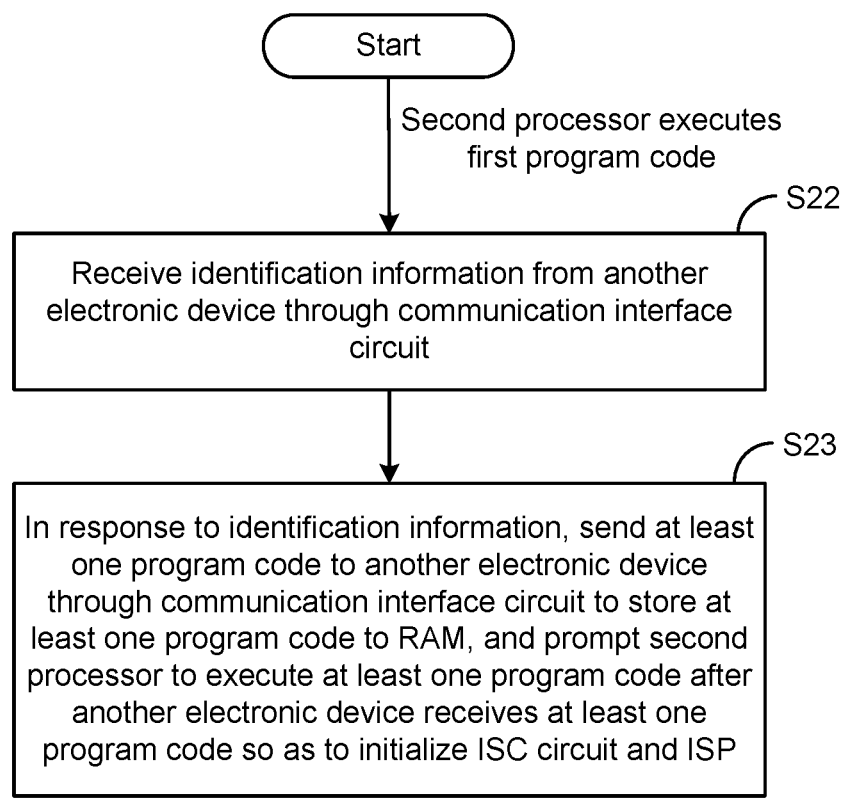
FIG. 3 is a flowchart of a method for controlling an electronic device according to an embodiment of the disclosure, wherein the method is applied to the electronic system shown in FIG. 1.

FIG. 3 shows a flowchart of a method for controlling an electronic device according to an embodiment of the disclosure, wherein the method is applicable to the electronic system shown in FIG. 1, and more particularly to the electronic device 100. For example, before proceeding to step S22, the second processor such as the processor 210 may execute the first program code such as the program code INI to initialize the communication interface circuit 222.

In step S22, the first processor such as the processor 110 receives through the communication interface circuit 122 the identification information IDI from the another electronic device such as the electronic device 200.

In step S23, in response to the identification information IDI, the first processor such as the processor 110 may send at least one program code such as the program code PG to the another electronic device such as the electronic device 200 through the communication interface circuit 122 and store the at least one program code to the RAM 233, and prompt the second processor 210 to execute the at least one program code after the another electronic device 200 receives the at least one program code, so as to initialize the ISC circuit 224 and the ISP 225.

For better understanding, the at least one program code (for example, the program code PG) may include at least one firmware code such as the at least one firmware code above and at least one software code such as the at least one software code above. For example, the firmware code may be used to initialize the ISC circuit 224 and the ISP 225, and the software code may be used to activate the operating system.

The operation process shown in FIG. 3 is described to provide better understanding; however, the disclosure is not limited to the example above. According to some embodiments, one or more steps may be added to the operation process in FIG. 3. For example, the one or more steps may include: (1) before sending the at least one program code, the first processor such as the processor 110 sending another program code to the another electronic device such as the electronic device 200 through the communication interface circuit 122 and storing the another program code to a memory in the second processor (for example, the processor 210); and (2) prompting the second processor such as the processor 210 to execute the another program code after the electronic device 200 receives the another program code, so as to initialize the RAM 223; however, the disclosure is not limited to the examples above. According to some embodiments, the another program code may be stored in the ROM 221 in advance, instead of being sent from the electronic device 100 to the electronic device 200 through the communication interface circuits 122 and 222, and the processor 110 can execute the another program code in the ROM 221 to initialize the RAM 223.

Figure 4:
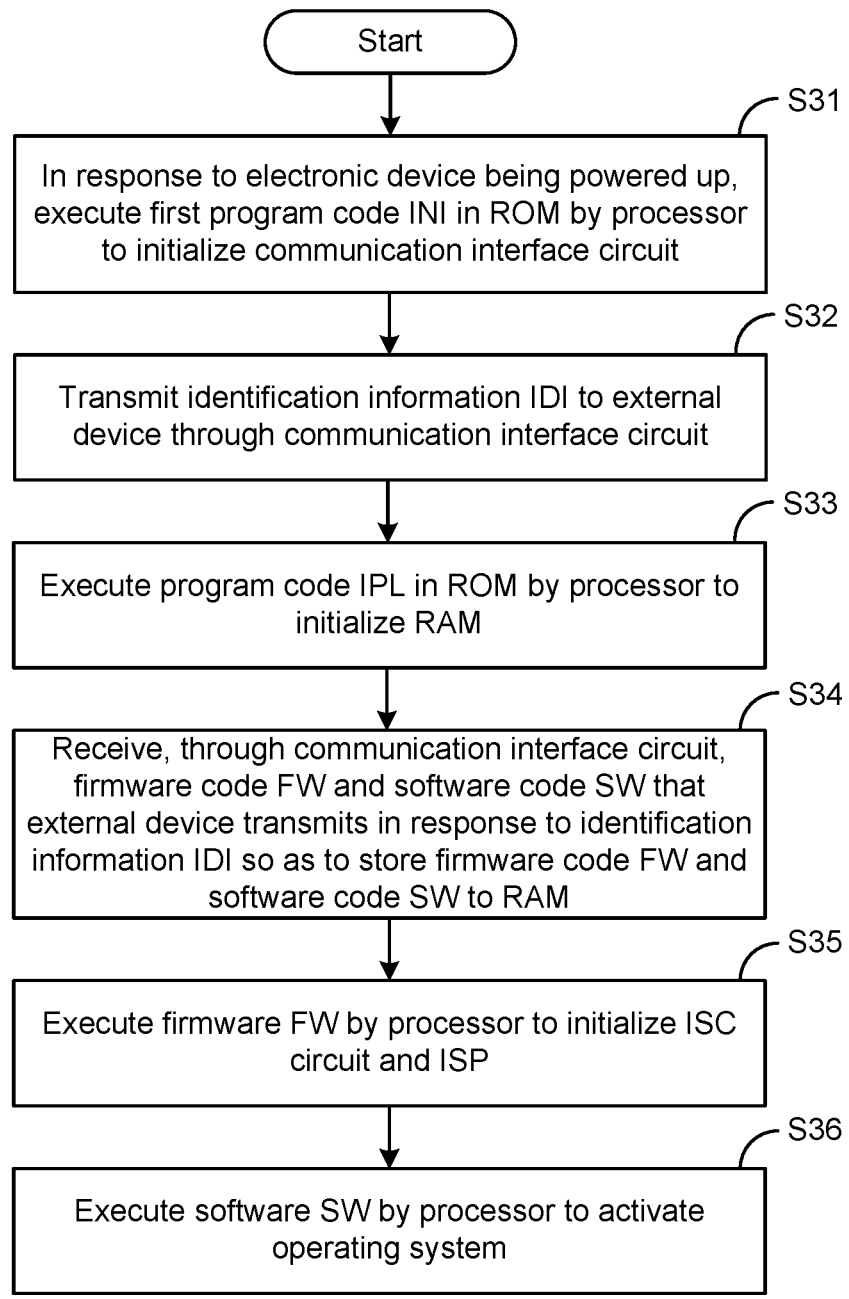
FIG. 4 depicts implementation details of the method shown in FIG. 2 according to an embodiment of the disclosure.

FIG. 4 depicts implementation details of the method shown in FIG. 2 according to an embodiment of the disclosure.

In step S31, in response to the electronic device 200 being powered up, the processor 210 can execute the program code INI in the ROM 221 to initialize the communication interface circuit 222.

In step S32, the processor 210 can send the identification information IDI to the external device (for example, the electronic device 100) through the communication interface circuit 222.

In step S33, the processor 210 can execute the program code IPL in the ROM 221 to initialize the RAM 223.

In step S34, the processor 210 can receive through the communication interface circuit 222 the firmware code FW and the software code SW that the external device (for example, the electronic device 100) sends in response to the identification information IDI, and store the firmware code FW and the software code SW to the RAM 223.

In step S35, the processor 210 can execute the firmware code FW to initialize the ISC circuit 224 and the ISP 225.

In step S36, the processor 210 can execute the software code SW to activate the operating system.

Figure 5:
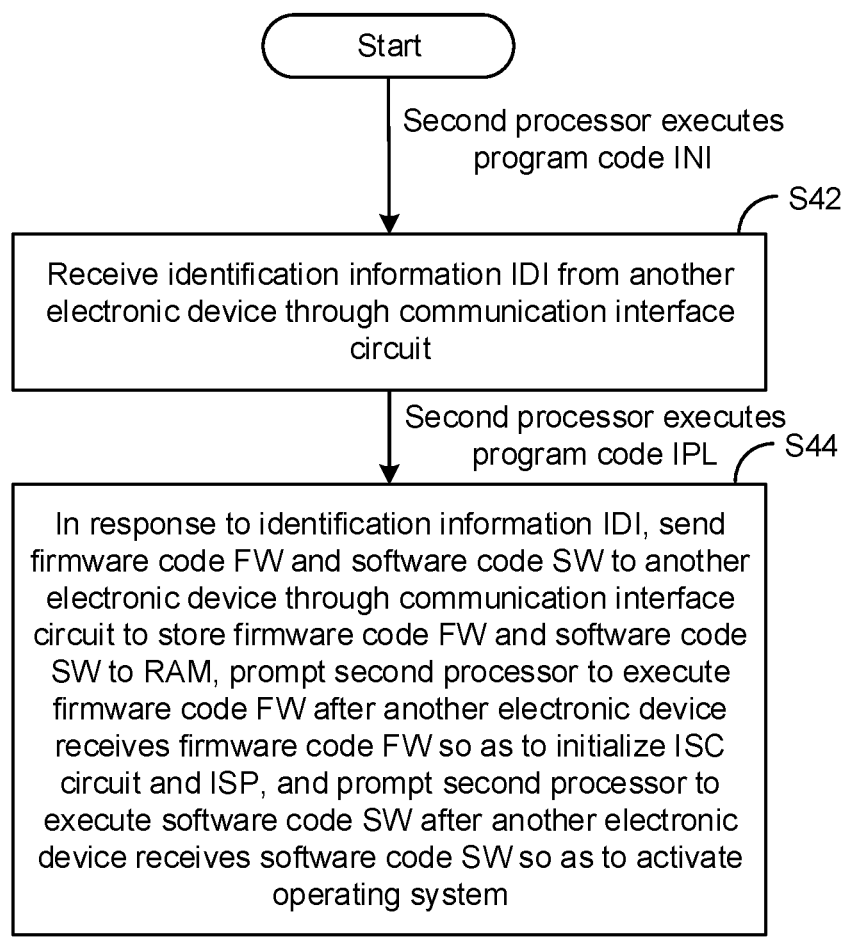
FIG. 5 depicts implementation details of the method shown in FIG. 3 according to an embodiment of the disclosure.

FIG. 5 depicts implementation details of the method shown in FIG. 3 according to an embodiment of the disclosure. For example, the second processor such as the processor 210 can execute the program code INI before proceeding to step S42 so as to initialize the communication interface circuit 222, and execute the program code IPL before proceeding to step S44 so as to initialize the RAM 223.

In step S42, the first processor such as the processor 110 receives the identification information IDI from the another electronic device such as the electronic device 200 through the communication interface circuit 122.

In step S44, in response to the identification information IDI, the first processor such as the processor 110 can send the firmware code FW and the software code SW to the another electronic device such as the electronic device 200 through the communication interface circuit 122 and store the firmware code FW and the software code SW to the RAM 223, prompt the second processor 210 to execute the firmware code FW after the another electronic device 200 receives the firmware code FW so as to initialize the ISC circuit 224 and the ISP 225, and prompt the second processor 210 to execute the software code SW after the another electronic device 200 receives the software code SW so as to activate the operating system.

Figure 6:
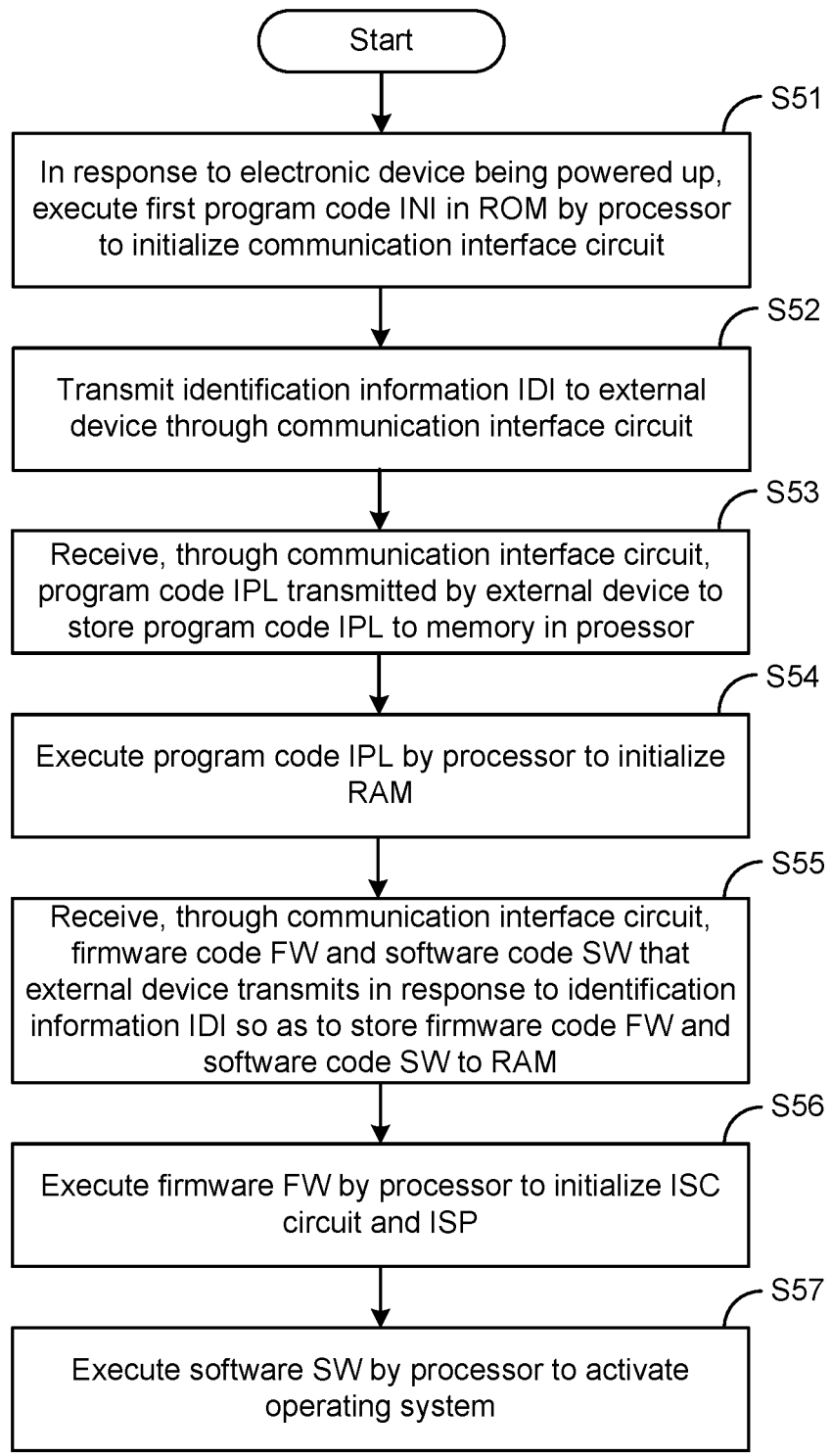
FIG. 6 depicts implementation details of the method shown in FIG. 2 according to another embodiment of the disclosure.

FIG. 6 depicts implementation details of the method shown in FIG. 2 according to another embodiment of the disclosure.

In step S51, in response to the electronic device 200 being powered up, the processor 210 can execute the program code INI in the ROM 221 to initialize the communication interface circuit 222.

In step S52, the processor 210 can send the identification information IDI to the external device (for example, the electronic device 100) through the communication interface circuit 222.

In step S53, the processor 210 can receive through the communication interface circuit 222 the program code IPL that the external device (for example, the electronic device 100) sends and store the program code IPL to a memory (for example, the XRAM 211) in the processor 210.

In step S54, the processor 210 can execute the program code IPL to initialize the RAM 223.

In step S55, the processor 210 can receive through the communication interface circuit 222 the firmware code FW and the software code SW that the external device (for example, the electronic device 100) sends in response to the identification information IDI, and store the firmware code FW and the software code SW to the RAM 223.

In step S56, the processor 210 can execute the firmware code FW to initialize the ISC circuit 224 and the ISP 225.

In step S57, the processor 210 can execute the software code SW to activate the operating system.

Figure 7:
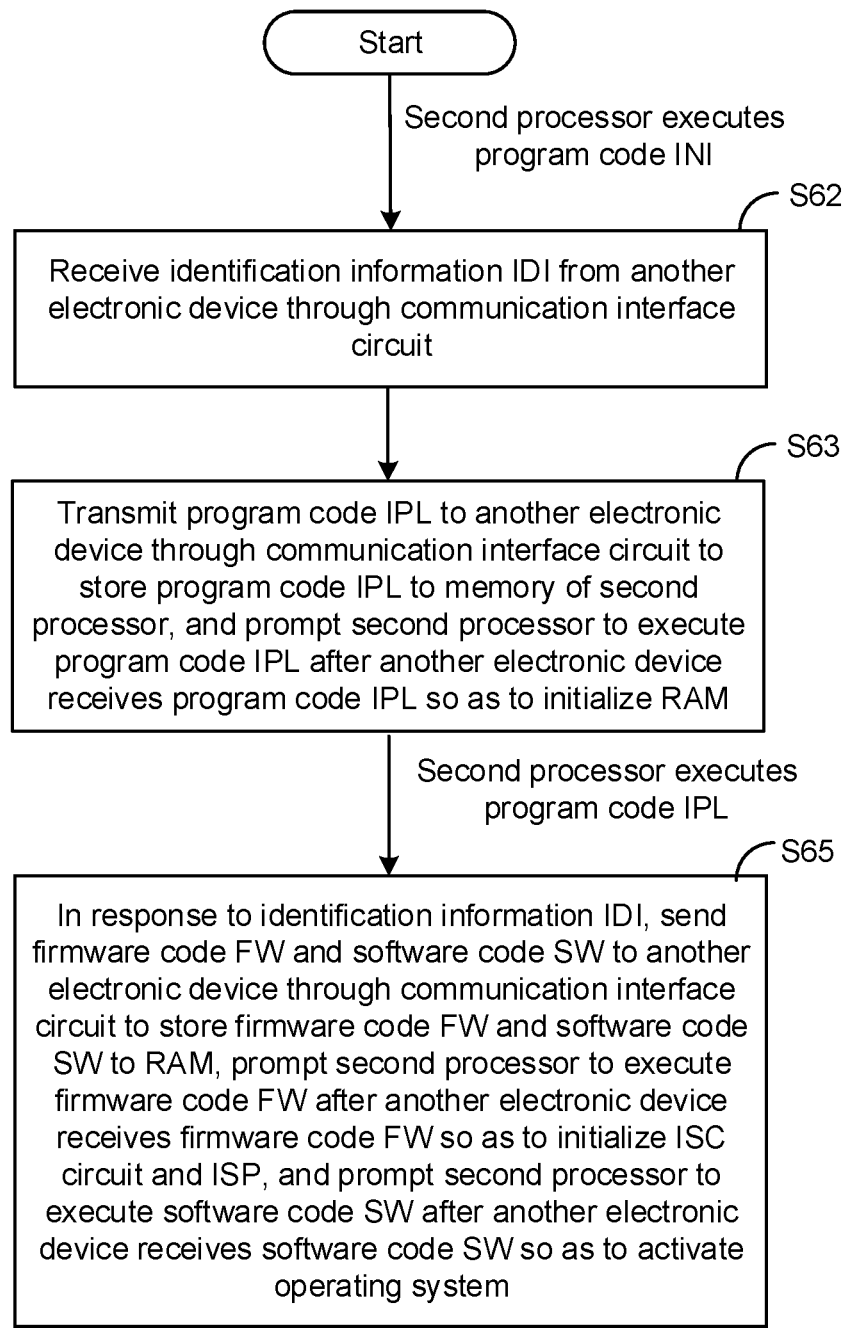
FIG. 7 depicts implementation details of the method shown in FIG. 3 according to another embodiment of the disclosure.

FIG. 7 depicts implementation details of the method shown in FIG. 3 according to another embodiment of the disclosure. For example, the second processor such as the processor 210 can execute the program code INI before proceeding to step S62 so as to initialize the communication interface circuit 222, and execute the program code IPL before proceeding to step S65 so as to initialize the RAM 223.

In step S62, the first processor such as the processor 110 receives the identification information IDI from the another electronic device such as the electronic device 200 through the communication interface circuit 122.

In step S63, the first processor such as the processor 110 can send the program code IPL to the another electronic device such as the electronic device 200 through the communication interface circuit 122 and store the program code IPL to the memory (for example, the XRAM 211) in the processor 210, and prompt the another electronic device 200 to execute the program code IPL after the another electronic device 200 receives the program code IPL so as to initialize the RAM 223.

In step S65, in response to the identification information IDI, the first processor such as the processor 110 may send the firmware code FW and the software code SW to the another electronic device such as the electronic device 200 through the communication interface circuit 122 and store the firmware code FW and the software code SW to the RAM 233, prompt the second processor 210 to execute the firmware code FW after the another electronic device 200 receives the firmware code FW so as to initialize the ISC circuit 224 and the ISP 225, and prompt the second processor 210 to execute the software code SW after the another electronic device 200 receives the software code SW so as to activate the operating system.

According to the embodiments above, the method of the disclosure is capable of properly managing storage of program codes so as to save a storage space and ensure normal operations of an electronic device. Moreover, the method of the disclosure is capable of saving hardware resources and related costs for an electronic device, and more particularly being capable of preventing the need of providing any non-volatile storage element used for storing the at least one firmware code and the at least one software code in advance. Thus, related costs can be correspondingly reduced. Compared to the prior art, the method of the disclosure is capable of implementing a compact, fast and reliable electronic device without bringing side-effects or less likely incurring side-effects.

The description above provides merely preferred embodiments of the disclosure, and all variations and modifications made based on the range of claims of the disclosure are to be encompassed within the scope of the disclosure.

What is claimed is:

1. A method for controlling an electronic device, the electronic device comprising a processor, a read-only memory (ROM), a random access memory (RAM), an image sensor control (ISC) circuit, an image signal processor (ISP) and a communication interface circuit, the method comprising:
   in response to the electronic device being powered up, executing a first program code in the ROM by the processor to initialize the communication interface circuit;
   transmitting identification information to an external device through the communication interface circuit;
   receiving, through the communication interface circuit, a second program code that the external device sends in response to the identification information so as to store the second program code to the RAM;
   executing the second program code by the processor to initialize the ISC circuit and the ISP,
   wherein the second program code comprises a firmware code and a software code, the firmware code is used to initialize the ISC circuit and the ISP, and the software code is used to activate an operating system, and
   the method further comprising:
   before receiving the second program code, receiving, through the communication interface circuit, a third program code that the external device sends so as to store the third program code to a memory in the processor; and
   executing the third program code by the processor to initialize the RAM.

2. The method according to claim 1, wherein the processor executes the first program code to detect a hardware state, and accordingly determines whether to transmit the identification information to the external device.

3. The method according to claim 2, wherein the detecting of a hardware state is detecting a connection state of a bootstrap circuit pin.

4. The method according to claim 1, wherein the communication interface circuit is a Universal Serial Bus (USB) circuit.

5. A method for controlling an electronic device, the electronic device comprising a first processor and a communication interface circuit, another electronic device comprising a second processor, a random access memory (RAM), an image sensor control (ISC) circuit, and an image signal processor (ISP), the method comprising:
   receiving identification information from the another electronic device through the communication interface circuit;
   in response to the identification information, sending at least one program code to the another electronic device through the communication interface circuit to store the at least one program code to the RAM, and prompting the second processor to execute the at least one program code to initialize the ISC circuit and the ISP,
   wherein the at least one program code comprises a firmware code and a software code, the firmware code is used to initialize the ISC circuit and the ISP, and the software code is used to activate an operating system, and
   the method further comprising:
   before transmitting the at least one program code, sending another program code to the another electronic device through the communication interface circuit to store the another program code to a memory in the second processor, and prompting the second processor to execute the another program code to initialize the RAM.

6. The method according to claim 5, wherein the communication interface circuit is a Universal Serial Bus (USB) circuit.

\* \* \* \* \*